(12) United States Patent
Tang

(10) Patent No.: US 7,924,576 B2
(45) Date of Patent: Apr. 12, 2011

(54) FIXING ASSEMBLY AND COMPUTER CASE USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 53 days.

(21) Appl. No.: 12/542,118

(22) Filed: Aug. 17, 2009

(65) Prior Publication Data

US 2010/0232104 A1 Sep. 16, 2010

(30) Foreign Application Priority Data

Mar. 13, 2009 (CN) .......................... 2009 1 0300831

(51) Int. Cl.
*H05K 7/02* (2006.01)
*H05K 7/04* (2006.01)
(52) U.S. Cl. .......................... 361/807; 361/801; 361/755
(58) Field of Classification Search .................. 361/730, 361/752, 790, 797, 800, 816, 818, 755, 801–803, 361/807, 810, 600, 679.01, 679.02, 679.6, 361/724; 312/312.1, 312.2, 257.1, 265.6; 439/92, 108, 284, 292–296, 345, 350, 353, 439/527, 607.01, 607.28, 939
See application file for complete search history.

(56) References Cited

U.S. PATENT DOCUMENTS

| | | | |
|---|---|---|---|
| 6,296,334 B1 * | 10/2001 | Liao | 312/223.2 |
| 6,654,236 B2 * | 11/2003 | Chen et al. | 361/679.55 |
| 6,970,361 B2 * | 11/2005 | Jansen | 361/759 |
| 6,975,519 B2 * | 12/2005 | Siahpolo et al. | 361/798 |
| 7,184,261 B2 * | 2/2007 | Chung | 361/679.56 |
| 7,483,263 B2 * | 1/2009 | Chen et al. | 361/679.02 |

* cited by examiner

*Primary Examiner* — Hung S Bui
(74) *Attorney, Agent, or Firm* — Clifford O. Chi

(57) ABSTRACT

A fixing assembly can fix a shielding panel to a housing of a computer case. The fixing assembly includes two sliding members and a driving member. The housing includes a front plate defining through holes. The shielding panel includes a plurality of latching hooks corresponding to the through holes. Each latching hook passes though the corresponding through hole. The sliding members are slidably attached to the opposite edge portions of the front plate respectively. Each sliding member defines a plurality of engaging holes corresponding to the through holes. Each engaging hole includes a latching portion and a receiving portion in communication with the latching portion. Each latching hook is latched in one corresponding latching portion or received in one corresponding receiving portion. The driving member is capable of sliding the sliding members such that each latching hook is movable between the corresponding latching portion and the corresponding receiving portion.

20 Claims, 5 Drawing Sheets

FIXING ASSEMBLY AND COMPUTER CASE USING THE SAME

BACKGROUND

1. Technical Field

The present invention relates to device housings and, more particularly, to a fixing assembly for a computer case.

2. Description of Related Art

A commonly used computer case includes a housing and a shielding panel detachably fixed to a front plate of the housing. The shielding panel prevents dust from entering the housing and prevents radiation escaping from the housing. The shielding panel includes a plurality of latching hooks extending from an inner surface, each latching hook forming a latching protrusion on a tip end thereof. The front plate defines a plurality of latching holes corresponding to the latching hooks. During assembly of the shielding panel to the front plate of the housing, the shielding panel is pressed towards the front plate to force the latching hooks to elastically deform, so that the latching hooks are snappingly received in the latching holes and the latching protrusions are latched by edges of the front plate at the latching holes. To detach the shielding panel from the front plate of the housing, the latching hooks are deformed one by one so that each latching protrusion is released from the corresponding latching hole. However, it is troublesome to deform the latching hooks one by one, and the latching hooks may be easily damaged if excessive force is applied to deform them.

Therefore, there is room for improvement within the art.

BRIEF DESCRIPTION OF THE DRAWINGS

The components in the drawings are not necessarily drawn to scale, the emphasis instead being placed upon clearly illustrating the principles of the present invention. Moreover, in the drawings, like reference numerals designate corresponding parts throughout the several views, and all the views are schematic.

DETAILED DESCRIPTION

Figure 1:
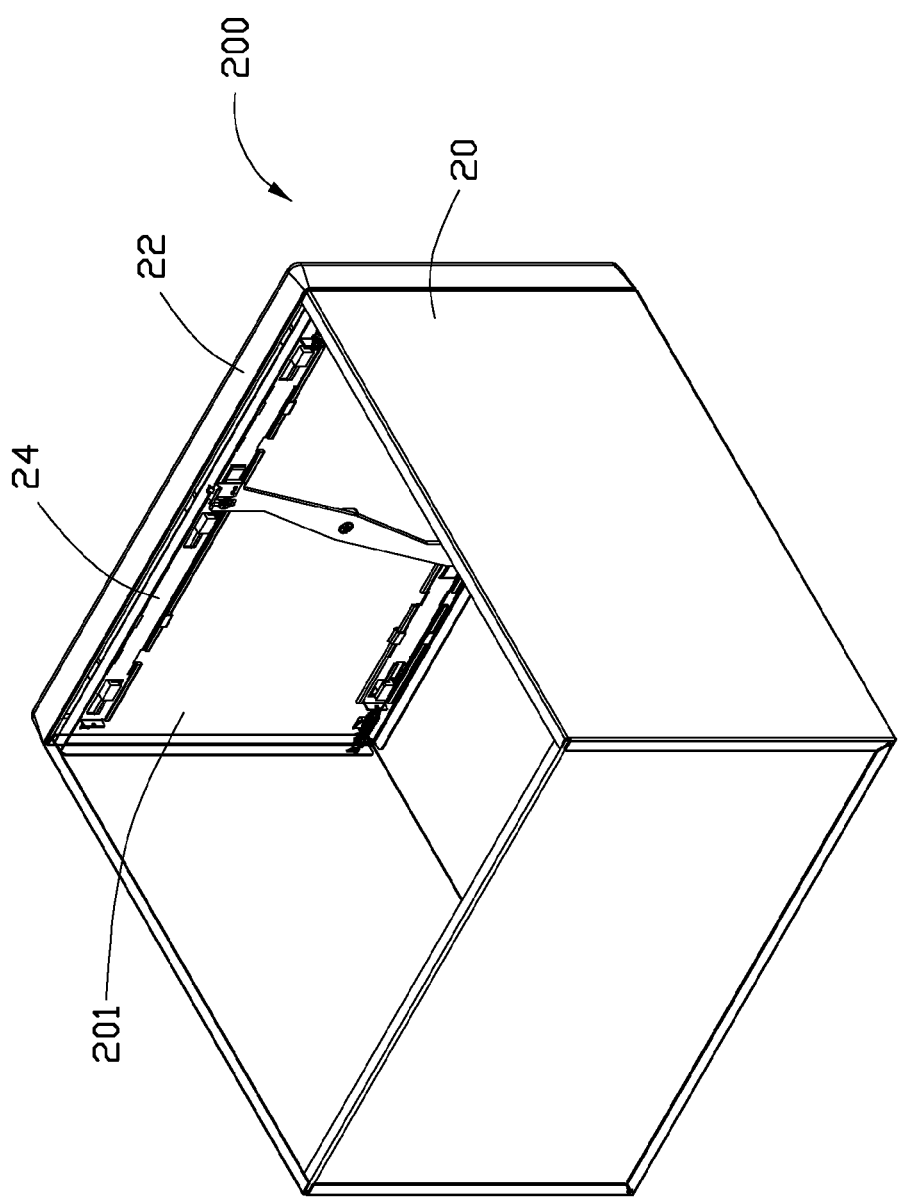
FIG. 1 is an isometric view of an embodiment of a computer case, the computer case including a shielding panel, a front plate, and a fixing assembly.

Referring to FIG. 1, a computer case 200 of one embodiment includes a housing 20, a shielding panel 22 and a fixing assembly 24. The housing 20 includes a front plate 201. The shielding panel 22 is detachably fixed to the front plate of the housing 20 by the fixing assembly 24, to prevent dust from entering the housing 20 and to prevent radiation escaping from the housing 20.

Figure 2:
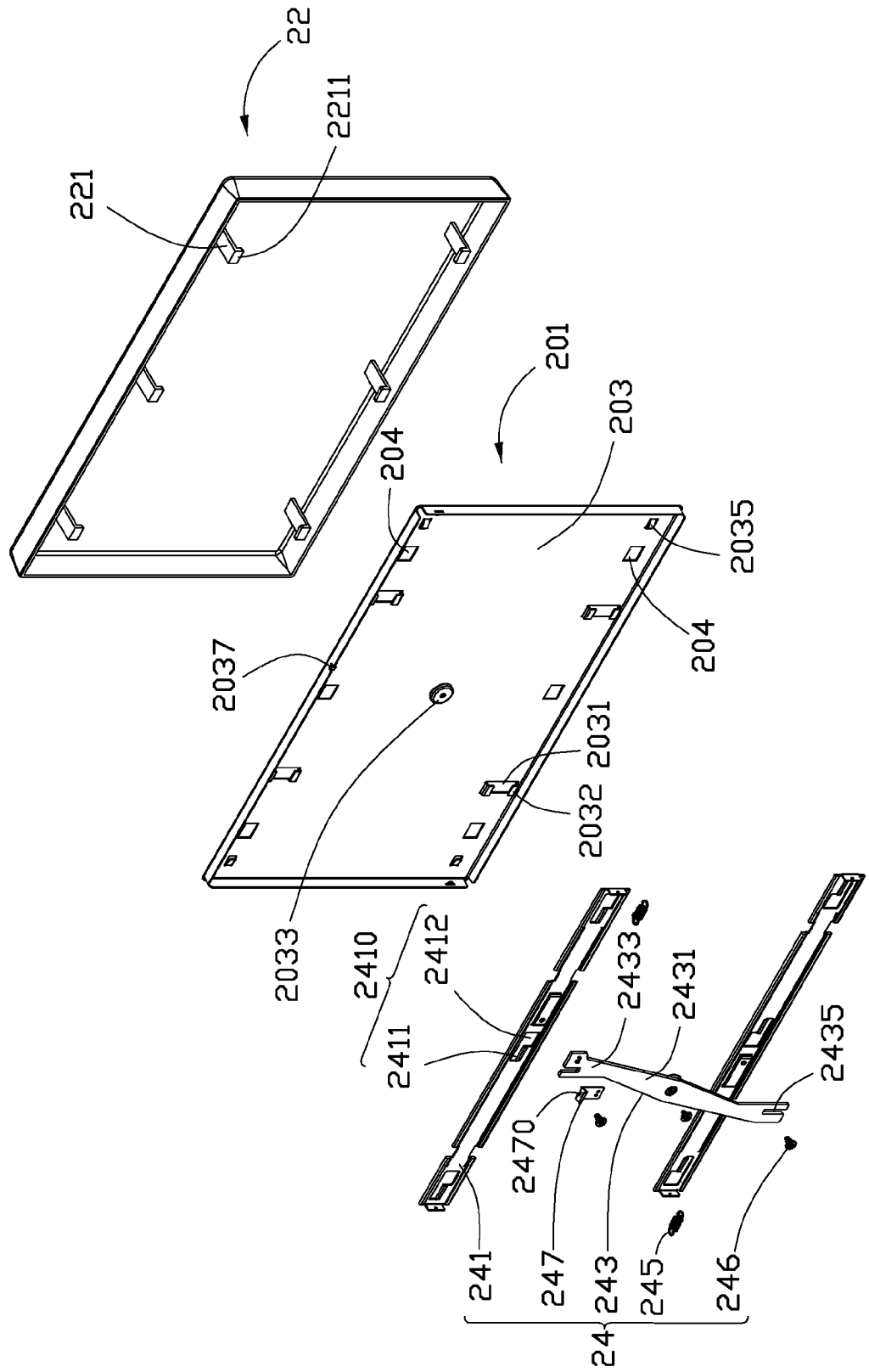
FIG. 2 is an exploded, isometric view of the shielding panel, the front plate, and the fixing assembly of FIG. 1.
Figure 3:
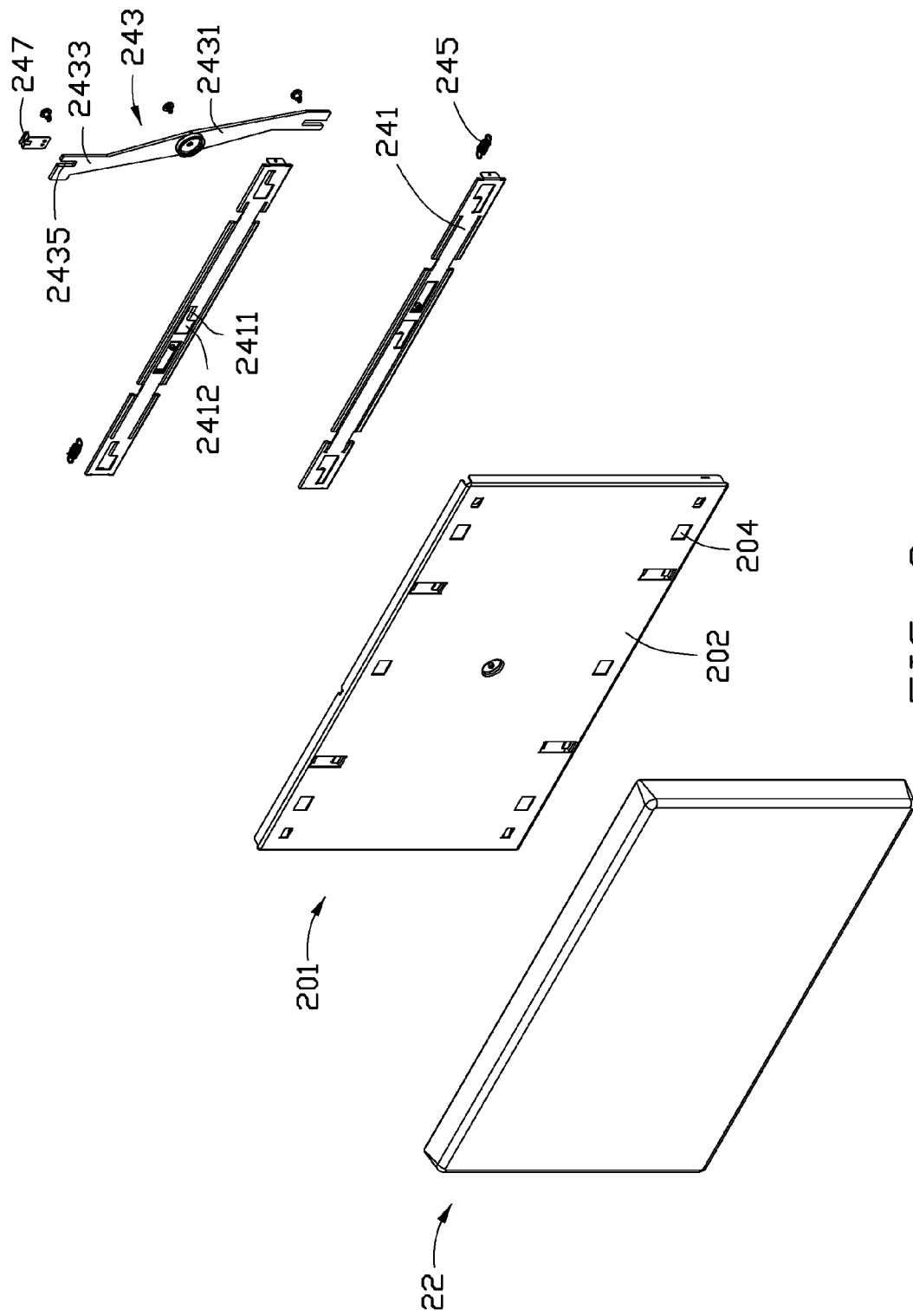
FIG. 3 is similar to FIG. 2, but shows another aspect thereof.

Referring also to FIGS. 2 and 3, the shielding panel 22 is a substantially rectangular plate. A plurality of latching hooks 221 extend from opposite edge portions of an inner surface of the shielding panel 22. In the illustrated embodiment, there are three latching hooks 221 at each of the opposite edge portions. The latching hooks 221 on each edge portion are aligned substantially in a row, and each latching hook 221 forms a latching protrusion 2211 on a tip end thereof.

The front plate 201 has a shape corresponding to the shielding panel 22. The front plate 201 includes an outer surface 202 an inner surface 203 at opposite sides thereof. The front plate 201 defines a plurality of through holes 204 in opposite edge portions thereof, corresponding to the latching hooks 221. Each through hole 204 is slightly larger than the corresponding latching hook 221, such that the latching hook 221 can pass through the through hole 204. The front plate 201 further includes four limiting fingers 2035 respectively extending from four corners of the inner surface 203. Each limiting finger 2035 is positioned adjacent to a nearest one of the through holes 204. Each of the two rows of through holes 204 are positioned between two corresponding limiting fingers 2035.

The front plate 201 defines a plurality of sliding grooves 2031. Each sliding groove 2031 is positioned generally between a corresponding pair of adjacent through holes 204. Two clamping hooks 2032 are formed at opposite extremities of each sliding groove 2031. The sliding grooves 2031 and the through holes 204 are generally aligned in the same row at each of the opposite edge portions of the front plate 201. A pivot portion 2033 is formed in a middle portion of the front plate 201. A locking protrusion 2037 is formed adjacent to a top edge of the inner surface 203 of the front plate 201.

Figure 4:
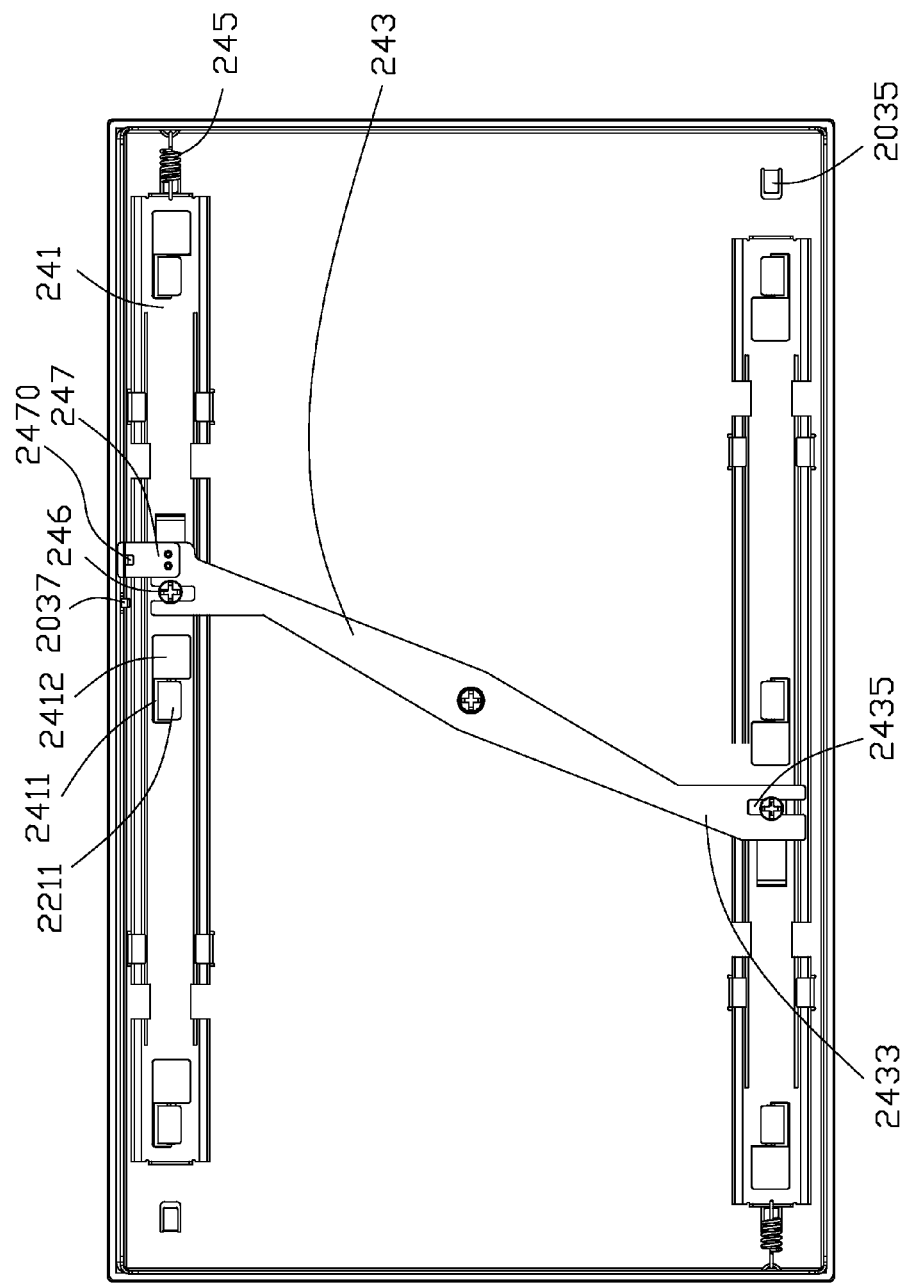
FIG. 4 is a plan view of a locked state of the shielding panel, the front plate, and the fixing assembly of FIG. 1.
Figure 5:
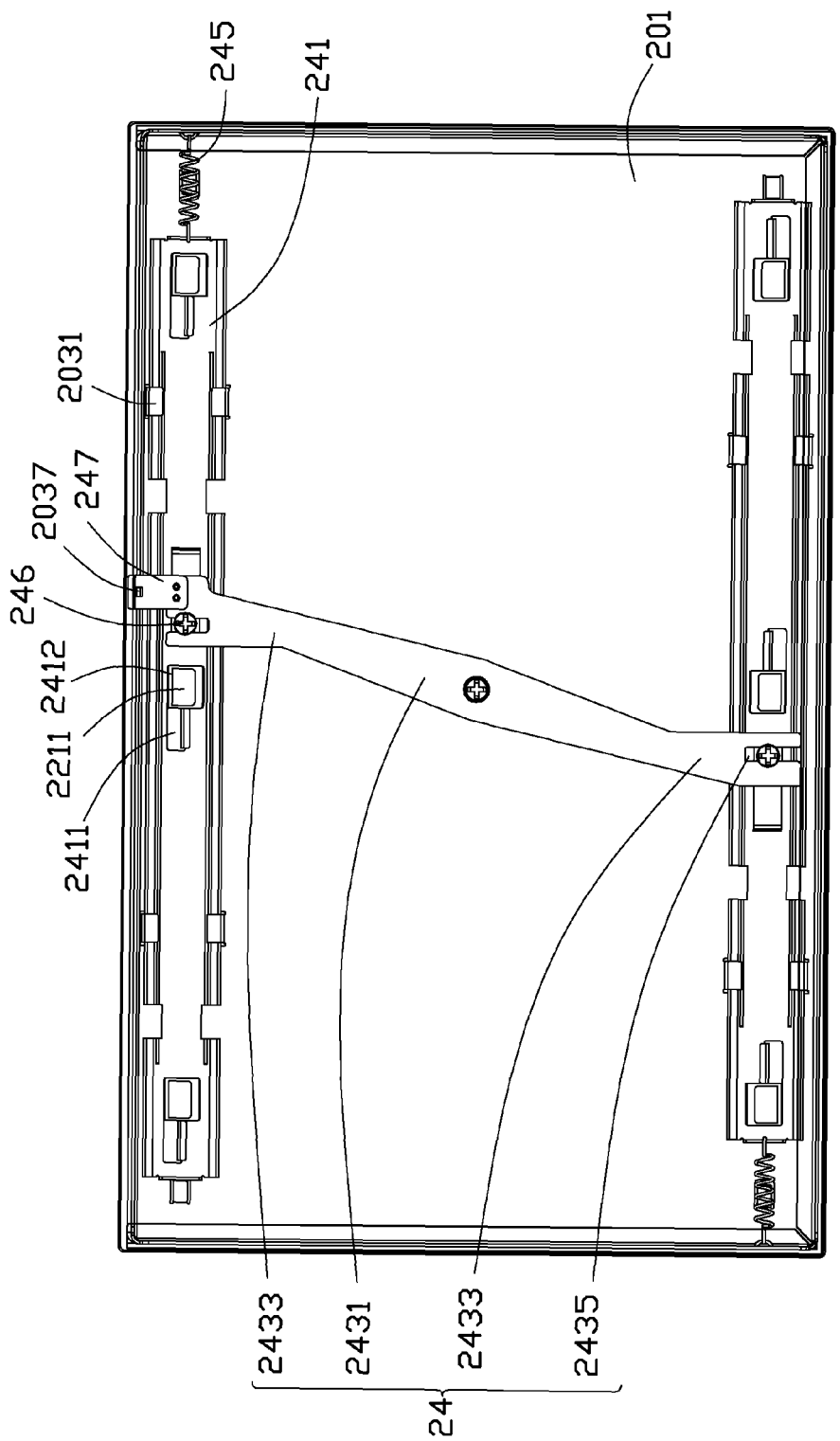
FIG. 5 is a plan view of an unlocked state of the shielding panel, the front plate, and the fixing assembly of FIG. 1.

Referring also to FIGS. 4 and 5, the fixing assembly 24 is positioned on the inner surface 203 of the front plate 201. The fixing assembly 24 includes two elongate sliding members 241, a driving member 243 for impelling the sliding members 241, two springs 245, two threaded fasteners 246, and a locking member 247.

The sliding members 241 are substantially rectangular, and a width of each sliding member 241 corresponds to the width of the respective sliding groove 2031. Each sliding member 241 defines a plurality of engaging holes 2410 corresponding to the plurality of through holes 204 of a respective side of the front plate 201. Each engaging hole 2410 includes a latching portion 2411, and a receiving portion 2412 in communication with the latching portion 2411. During assembly, each sliding member 241 is positioned between two corresponding limiting fingers 2035 on the same top or bottom side of the front plate 201, and covers the through holes 204 on this side of the front plate 201. Thus, the sliding member 241 is limited to slide between the two limiting fingers 2035. The two sliding members 241 have the same configuration (i.e., structure and/or arrangement), but are positioned along opposite orientations. That is, each sliding member 241 is oriented as if it had been rotated 180° from the orientation of the other sliding member 241. Each pair of clamping hooks 2032 at each sliding groove 2031 movably clamp a corresponding portion of the respective sliding member 241. The latching protrusion 2211 of each latching hook 221 passes through a corresponding one of the receiving portions 2412. When the sliding member 241 moves relative to each sliding groove 2031, the latching protrusion 2211 of the corresponding latching hook 221 is latched in the corresponding latching portion 2411. Opposite ends of each spring 245 are respectively connected to a corresponding one of the sliding members 241 and to an end portion of the front plate 201. When the spring 245 is in an initial state, each latching portion 2411 of the sliding member 241 is located directly opposite a corresponding through hole 204 (see FIG. 4). When the sliding member 241 is impelled by the driving member 243 to extend the spring 245, each receiving portion 2412 is located directly opposite the corresponding through hole 204 (see FIG. 5).

The driving member 243 includes an elongated base portion 2431, and two contact portions 2433 extending from opposite ends of the base portion 2431, respectively. In the illustrated embodiment, the contact portions 2433 have different but similar configurations. The contact portions 2433 are substantially parallel to each other, and oblique to the elongated base portion 2431. Each contact portion 2433 defines a sliding slot 2435. The orientation of the sliding slot 2435 is same as that of the contact portion 2433. That is, the sliding slot 2435 is substantially parallel to its contact portion 2433. The driving member 243 may be rotatably connected to the pivot portion 2033 by a fastener (not labeled). Each contact portion 2433 of the driving member 243 is positioned adjacent to a middle one of the engaging holes 2410. A corresponding one of the threaded fasteners 246 passes through the sliding slot 2435 and is fixed to the sliding member 241, such that the threaded fastener 246 can slide up or down in the corresponding sliding slot 2435, and the driving member 243 can drive the sliding member 241 to move. In particular, when the driving member 243 is rotated about the pivot portion 2033, the contact portions 2433 impel the threaded fasteners 246 to drive the sliding members 24 to move in opposite directions.

The locking member 247 is a substantially L-shaped plate, and defines a locking hole 2470 having a shape corresponding to a shape of the locking protrusion 2037 of the front plate 201. The locking member 247 is fixed to one of the contact portions 2433 of the driving member 243. In the illustrated embodiment, the locking member 247 is fixed to a top one of the contact portions 2433, by way of, for example, riveting. When the driving member 243 is rotated until the middle receiving portion 2412 of the top sliding member 241 is positioned opposite the corresponding through hole 204, the locking protrusion 2037 of the front plate 201 is received in the locking hole 2470 such that the locking member 247 is detachably locked to the front plate 201. Thus, the driving member 243 can be stably held in position with all the receiving portions 2412 of both sliding members 241 being positioned opposite the corresponding through holes 204.

When the shielding panel 22 is in a locked state, the shielding panel 22 is fixed to the front plate 201, with the latching hooks 221 passing through the through holes 204 and latching portions 2411, and the latching protrusions 2211 latching with edges of the corresponding sliding members 241 at the latching portions 2411. The springs 245 are in a non-stretched state, and the locking member 247 is free from the locking protrusion 2037 (i.e., unlocked) (see FIG. 4). To detach the shielding panel 22 from the front plate 201, the driving member 243 is rotated. Then when the receiving portions 2412 of the sliding members 241 reach positions opposite the through holes 204, the latching hooks 221 have simultaneously moved relative to the sliding members 241 from being in the latching portions 2411 to being in the receiving portions 2412. In this position, the locking member 247 is locked to the front plate 201 (see above), which prevents the driving member 243 from moving any further. At that time, the shielding panel 22 can be pulled away and detached from the front plate 201.

It should be noted that in alternative embodiments, the number of latching hooks 221 at each of the edge portions of the inner surface of the shielding panel 22 may be other than three. For example, there may be only one latching hook 221 or only two latching hooks 221 at each of the edge portions. In addition, the number of latching hooks 221 at one of the edge portions may be different from the number of latching hooks 221 at the other edge portion. Further, the number of latching portions 2411 and the number of receiving portions 2412 should each correspond to the number of latching hooks 221.

In addition, the driving member 243 is not limited to rotating in order to move the sliding members 241 in opposite directions. In alternative embodiments, the driving member 243 may be slidable relative to the front plate 201, and accordingly the two sliding members 241 may be positioned to have the same orientation. When the driving member 243 slides relative to the front plate 201, the sliding members 241 are driven in the same direction. The latching hooks 221 move from the latching portions 2411 to the receiving portions 2412, such that the shielding panel 22 can be detached from the front plate 201.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A computer case, comprising:
   a housing comprising a front plate, the front plate defining a plurality of through holes in each of opposite edge portions thereof;
   a shielding panel comprising a plurality of latching hooks formed on opposite edge portions thereof corresponding to the through holes, each latching hook passing though the corresponding through hole; and
   a fixing assembly for detachably fixing the shielding panel to the front plate, the fixing assembly comprising:
      two sliding members slidably attached to the opposite edge portions of the front plate respectively, each sliding member defining a plurality of engaging holes corresponding to the plurality of the through holes of a respective side of the front plate, each engaging hole including a latching portion and a receiving portion in communication with the latching portion, each latching hook being latched in one corresponding latching portion when the shielding panel is in a locked state or received in one corresponding receiving portion when the shielding panel is in an unlocked state; and
      a driving member capable of sliding the sliding members such that each latching hook is movable between the corresponding latching portion and the corresponding receiving portion.

2. The computer case of claim 1, wherein the front plate comprises an outer surface and an inner surface at opposite sides thereof, the shielding panel is positioned adjacent to the outer surface, and the sliding members are positioned adjacent to the inner surface.

3. The computer case of claim 2, wherein the front plate defines a plurality of sliding grooves at each of the opposite edge portions thereof, and a portion of each sliding member is slidably received in the corresponding sliding grooves.

4. The computer case of claim 3, wherein the sliding members are substantially rectangular and a width of each sliding member corresponds to the width of each of the respective sliding grooves.

5. The computer case of claim 3, wherein two clamping hooks are formed at opposite extremities of each sliding groove, and each pair of clamping hooks at each sliding groove movably clamp a corresponding portion of the respective sliding member.

6. The computer case of claim 2, further comprising a pivot portion formed in a middle portion of the front plate, wherein the driving member is rotatably connected to the pivot portion.

7. The computer case of claim 6, wherein the driving member comprises an elongated base portion and two contact portions extending from opposite ends of the elongated base portion, respectively, each contact portion defines a sliding slot, and the fixing assembly further comprises two threaded fasteners, each threaded fastener passing through one corresponding sliding slot and fixed to one of the sliding members such that when the driving member is rotated, the driving member drives the threaded fasteners to move the sliding members in opposite directions.

8. The computer case of claim 7, wherein the contact portions are substantially parallel to each other, and are oblique to the elongated base portion.

9. The computer case of claim 7, further comprising a locking protrusion formed at to the inner surface of the front plate adjacent to one of the opposite edge portions, wherein the fixing assembly further comprises a locking member fixed to one of the contact portions of the driving member, the locking member is a substantially L-shaped plate and defines a locking hole having a shape corresponding to a shape of the locking protrusion of the front plate, and when the locking protrusion of the locking member is received in the locking hole, the locking member is detachably locked to the front plate.

10. The computer case of claim 1, wherein the fixing assembly further comprises two springs, opposite ends of which are respectively connected to a corresponding one of the sliding members and to an end portion of the front plate.

11. A fixing assembly for fixing a shielding panel to a housing of a computer case, the housing comprising a front plate, the front plate defining a plurality of through holes in each of opposite edge portions thereof, the shielding panel comprising a plurality of latching hooks formed on opposite edge portions thereof corresponding to the through holes, each latching hook passing though the corresponding through hole, the fixing assembly comprising:

two elongate sliding members slidably attached to the opposite edge portions of the front plate, respectively, each sliding member defining a plurality of engaging holes corresponding to the plurality of the through holes of a respective side of the front plate, each engaging hole including a latching portion and a receiving portion in communication with the latching portion, wherein the latching portion of each engaging hole is capable of latchingly receiving one corresponding latching hook when the fixing assembly is in a locking state and the corresponding receiving portion is capable of non-latchingly receiving said one corresponding latching hook when the fixing assembly is in a releasing state; and a driving member capable of sliding the sliding members such that each engaging hole is movable relative to said one corresponding latching hook between a position corresponding to the locking state and a position corresponding to the releasing state.

12. The fixing assembly of claim 11, wherein the sliding members are configured to be capable of being positioned adjacent to an inner surface of the front plate.

13. The fixing assembly of claim 12, wherein each sliding member is configured to be capable of being slidably received adjacent to the inner surface of the front plate.

14. The fixing assembly of claim 13, wherein a width of each sliding member corresponds to a width of a respective sliding groove defined by the front plate at the inner surface.

15. The fixing assembly of claim 14, wherein a thickness of each sliding member corresponds to a sliding clearance provided by each of two clamping hooks formed by the front plate at the inner surface at opposite extremities of each sliding groove.

16. The fixing assembly of claim 12, wherein the driving member is configured to be rotatably connected to a pivot portion formed in a middle portion of the front plate.

17. The fixing assembly of claim 16, further comprising two threaded fasteners, wherein the driving member comprises an elongated base portion and two contact portions extending from opposite ends of the base portion respectively, each contact portion defines a sliding slot, and each threaded fastener passes through one corresponding sliding slot and is fixed to one of the sliding members such that when the driving member is rotated, the sliding members move in opposite directions.

18. The fixing assembly of claim 17, wherein the contact portions are substantially parallel to each other, and are oblique to the elongated base portion.

19. The fixing assembly of claim 17, wherein the fixing assembly comprises a locking member fixed to one of the contact portions of the driving member, the locking member is a substantially L-shaped plate and defines a locking hole having a shape corresponding to a shape of a locking protrusion of the front plate, and when the locking hole of the locking member receives the locking protrusion, the locking member is detachably locked in position relative to the front plate.

20. The fixing assembly of claim 11, further comprising two springs, wherein one end of each spring is connected to a corresponding one of the sliding members, and the other end of the spring is capable of being attached to the front plate.

\* \* \* \* \*